US008238287B1

(12) United States Patent
Gopi et al.

(10) Patent No.: US 8,238,287 B1
(45) Date of Patent: Aug. 7, 2012

(54) METHOD AND APPARATUS FOR PROVIDING QUALITY OF SERVICE (QOS) IN A WIRELESS LOCAL AREA NETWORK

(75) Inventors: Paramesh Gopi, San Jose, CA (US); Sameer Bidichandani, Mountain View, CA (US); Aswath Mohan, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1995 days.

(21) Appl. No.: 10/960,551

(22) Filed: Oct. 6, 2004

(51) Int. Cl.
*H04W 4/00* (2009.01)
*H04L 12/28* (2006.01)

(52) U.S. Cl. .................... 370/328; 370/338; 370/401

(58) Field of Classification Search .............. None
See application file for complete search history.

(56) References Cited

U.S. PATENT DOCUMENTS

| 4,905,302 | A | 2/1990 | Childress |
| 5,140,589 | A | 8/1992 | Otsuka |
| 5,832,365 | A | 11/1998 | Chen et al. |
| 5,881,095 | A | 3/1999 | Cadd |
| 6,128,512 | A | 10/2000 | Trompower et al. |
| 6,141,531 | A | 10/2000 | Williams et al. |
| 6,175,571 | B1 | 1/2001 | Haddock et al. |
| 6,301,514 | B1 | 10/2001 | Canada et al. |
| 6,571,284 | B1 | 5/2003 | Suonvieri |
| 6,751,456 | B2 * | 6/2004 | Bilgic ........................... 455/418 |
| 6,934,752 | B1 * | 8/2005 | Gubbi ........................... 709/225 |
| 7,092,434 | B2 | 8/2006 | Moon et al. |
| 7,209,703 | B1 | 4/2007 | Yarkosky |
| 7,280,799 | B1 | 10/2007 | Najafi et al. |
| 7,283,816 | B2 | 10/2007 | Fok et al. |
| 7,376,122 | B2 * | 5/2008 | Draves et al. ................. 370/351 |
| 2003/0013410 | A1 | 1/2003 | Park |
| 2003/0103521 | A1 * | 6/2003 | Raphaeli et al. .............. 370/445 |
| 2003/0108017 | A1 * | 6/2003 | Famolari ....................... 370/338 |
| 2003/0123401 | A1 | 7/2003 | Dean |
| 2003/0157894 | A1 | 8/2003 | Han et al. |
| 2003/0195702 | A1 | 10/2003 | Koga |
| 2003/0214905 | A1 * | 11/2003 | Solomon et al. .............. 370/229 |
| 2004/0110469 | A1 | 6/2004 | Judd et al. |
| 2004/0125779 | A1 * | 7/2004 | Kelton et al. ................. 370/338 |
| 2004/0202141 | A1 * | 10/2004 | Sinivaara et al. ............. 370/338 |
| 2004/0240417 | A1 | 12/2004 | Kim |
| 2004/0255192 | A1 | 12/2004 | Watanabe et al. |
| 2004/0266340 | A1 | 12/2004 | Ivanov et al. |
| 2005/0018651 | A1 * | 1/2005 | Yan et al. ...................... 370/352 |
| 2005/0053025 | A1 | 3/2005 | Duffy et al. |
| 2005/0094663 | A1 * | 5/2005 | Rahman et al. ............... 370/466 |
| 2005/0273790 | A1 | 12/2005 | Kearney et al. |

(Continued)

OTHER PUBLICATIONS

"Part 16: Air Interface For Fixed Broadband Wireless Access Systems", IEEE 802.16, IEEE Standard For Local and Metropolitan Area Networks, Oct. 1, 2004.

(Continued)

*Primary Examiner* — Marcus R Smith

(57) ABSTRACT

Methods, apparatus, and computer programs for configuring one or more transmission parameters of a wireless client in a wireless local area network (WLAN) are provided. In one implementation, the methods include receiving capability information from a wireless client, generating a configuration table including at least one selectable configuration option corresponding to the capability information of the wireless client, receiving user input selecting a configuration option within the configuration table, and generating and sending a configuration packet to the wireless client. The configuration packet contains configuration data for configuring one or more transmission parameters of the wireless client based on the selected configuration option.

77 Claims, 6 Drawing Sheets

U.S. PATENT DOCUMENTS

| | | | |
|---|---|---|---|
| 2006/0039333 A1* | 2/2006 | Pirzada et al. | 370/338 |
| 2006/0063484 A1 | 3/2006 | Proctor et al. | |
| 2006/0064730 A1* | 3/2006 | Rael et al. | 725/95 |
| 2006/0098592 A1 | 5/2006 | Proctor, Jr. et al. | |
| 2006/0182108 A1 | 8/2006 | Krumel | |
| 2006/0205342 A1 | 9/2006 | McKay et al. | |
| 2006/0276211 A1* | 12/2006 | Gallo | 455/507 |
| 2007/0008889 A1 | 1/2007 | Seo | |
| 2007/0025486 A1 | 2/2007 | Gainey et al. | |
| 2007/0066220 A1 | 3/2007 | Proctor et al. | |

OTHER PUBLICATIONS

"*System Requirements For IEEE 802.20 Mobile Broadband Wireless Access Systems—Version 14*", IEEE Standards Working Group 802.20, Jul. 16, 2004, vol. 16.

"Information technology—Telecommunications and information exchange between systems—Local and metropolitan area networks—Specific requirements—Part 11: Wireless LAN Medium Access Control (MAC) and Physical Layer (PHY) specifications," IEEE Std. 802.11 (1999).

"Part 11: Wireless LAN Medium Access Control (MAC) and Physical Layer (PHY) specifications: High-Speed Physical Layer in the 5 GHz Band," IEEE Std. 802.11a (1999).

"Part II: Wireless LAN Medium Access Control (MAC) and Physical Layer (PHY) specifications: Higher-Speed Physical Layer Extension in the 2.4 GHz Band," IEEE Std. 802.11b (1999).

"Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band," IEEE Std. 802.11g (2003).

"TGn Sync Proposal Technical Specification," IEEE Std. 802.11n (2005).

\* cited by examiner

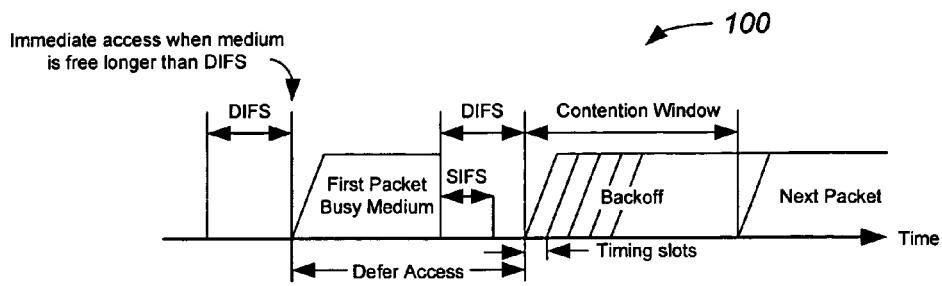
FIG. _1
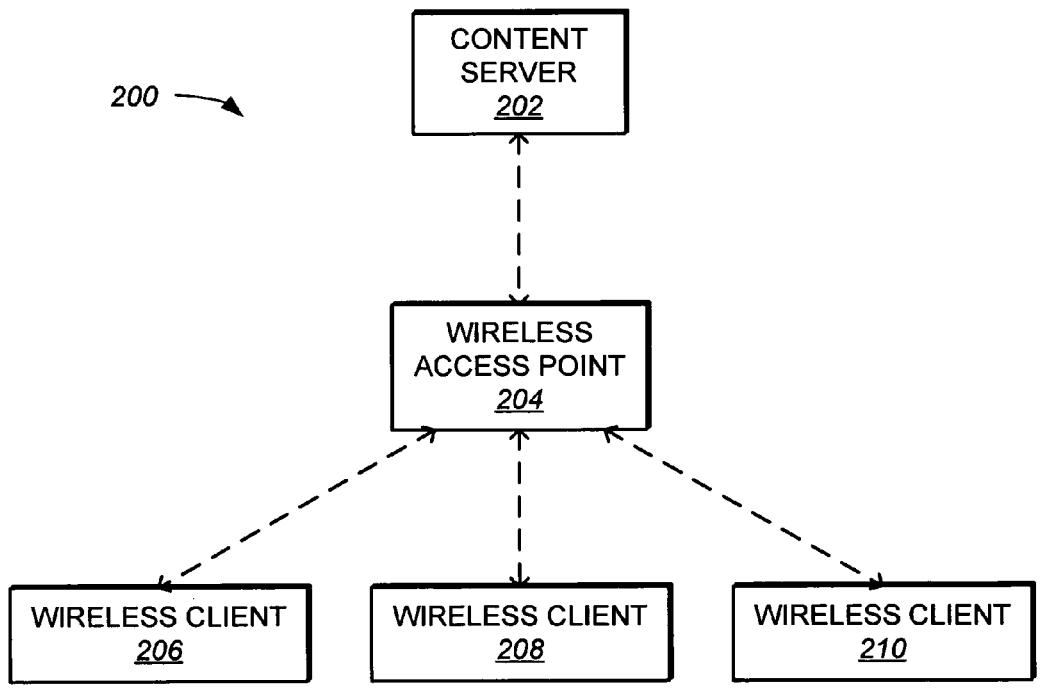
FIG. _2

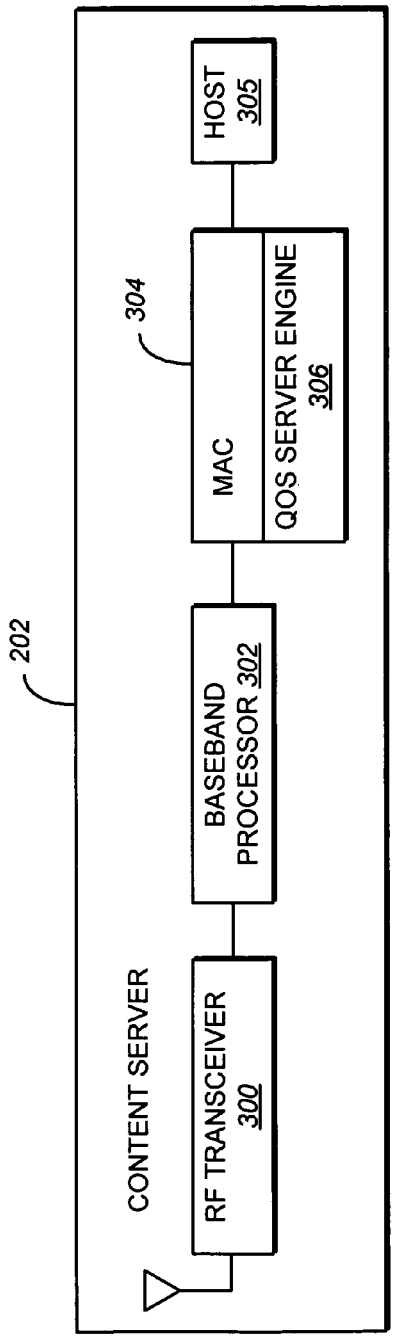
FIG. — 3A
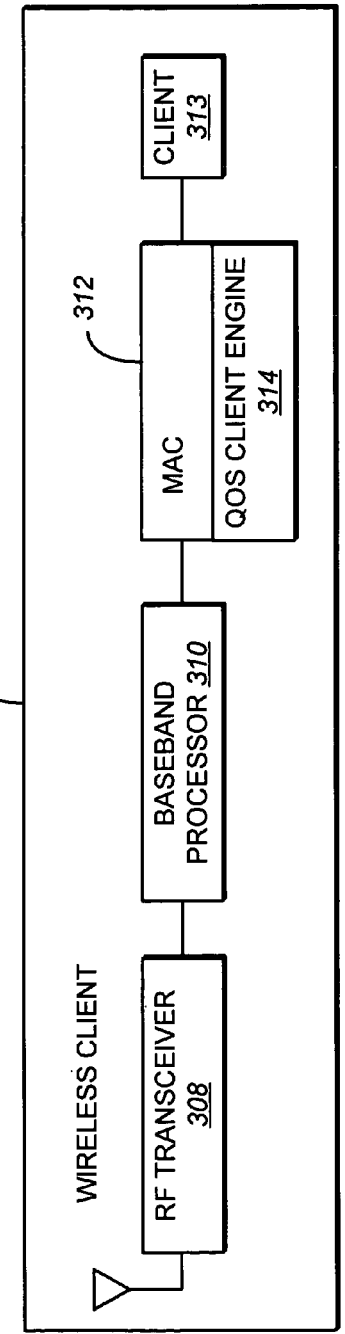
FIG. — 3B

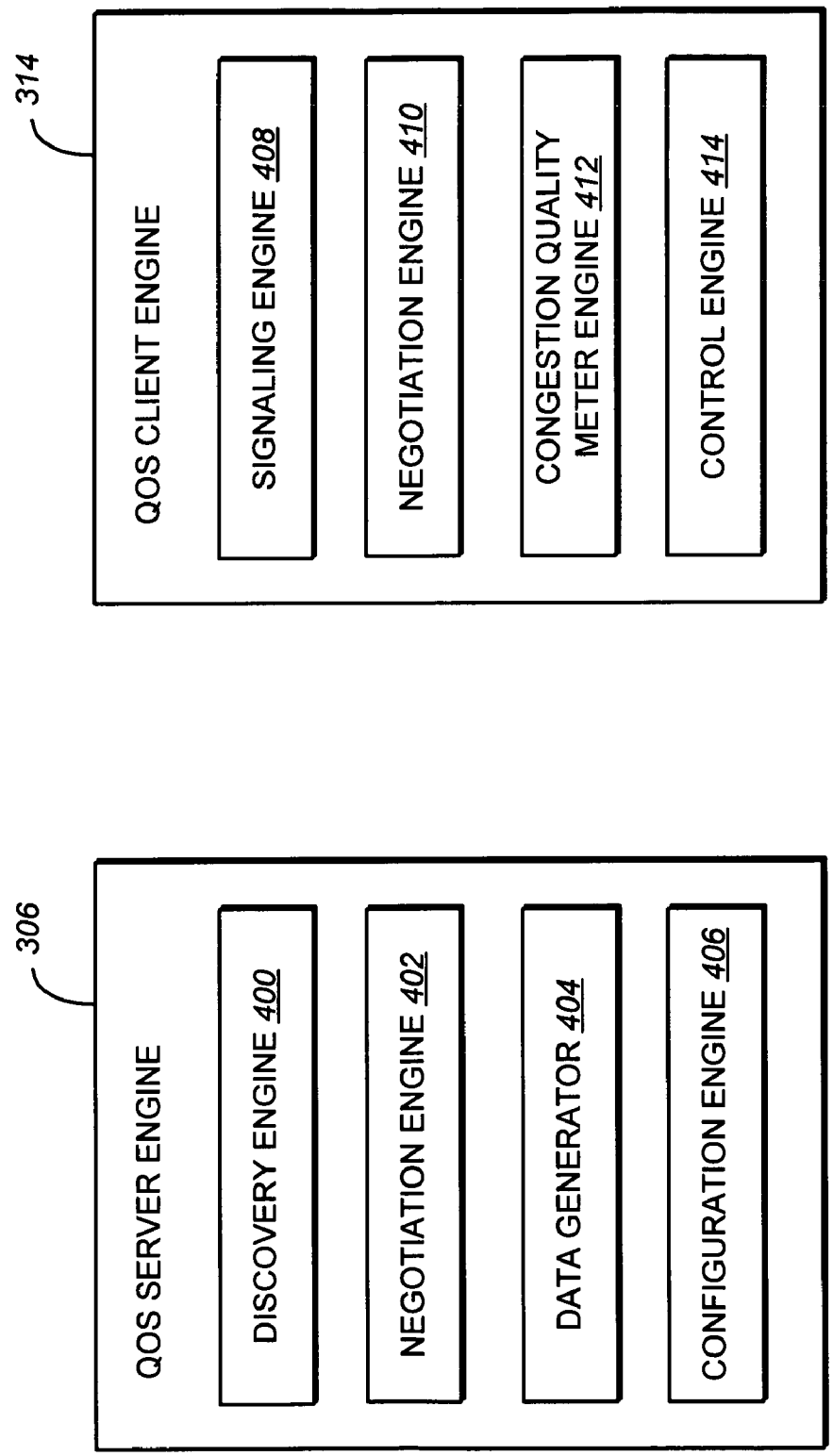

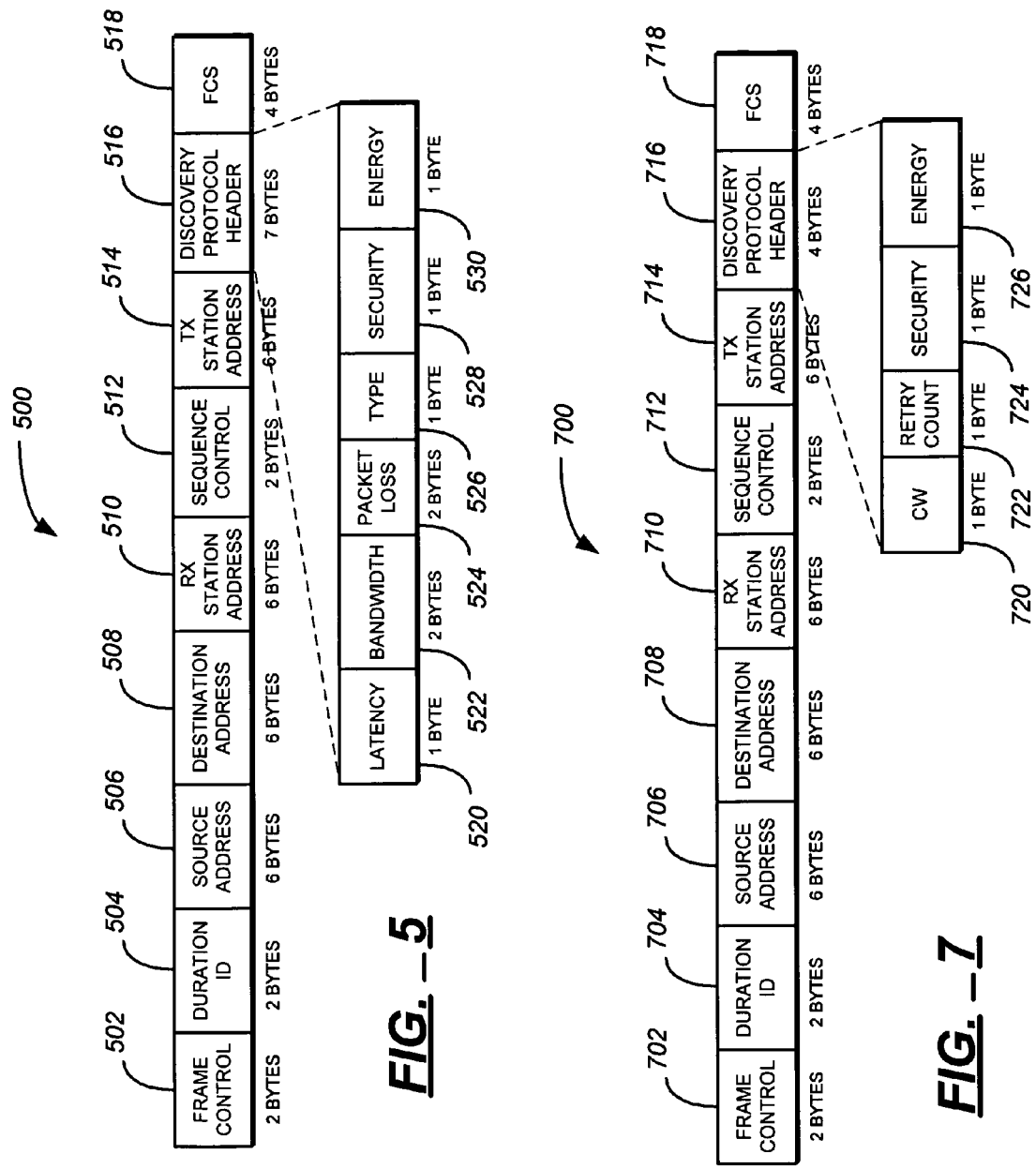

| DEVICE TYPE | CAPABILITY | | CONGESTION QUALITY (PRESENT) | RECOMMENDATION |
|---|---|---|---|---|
| SPEAKER | ○ MP3 | ● PCM | ▨▨▨▨▨▨ | PCM |
| VIDEO TV 1 | ○ MP4 | ● MP3 | ▨ | MP4 |
| | | | | |
| COMPUTER DATA SERVICES | | | Download - 5.2 Mps ▨ | |

FIG. _6

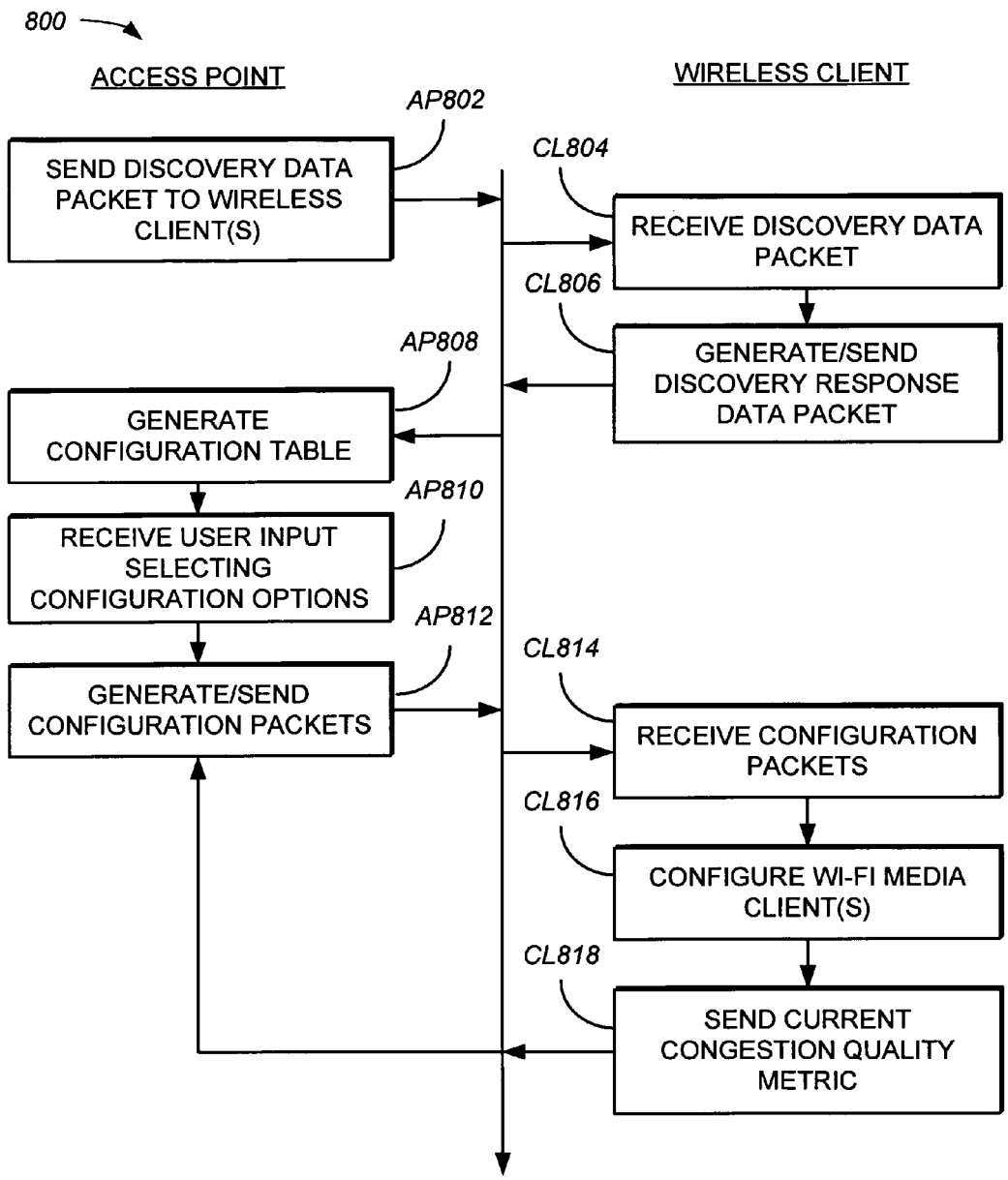
FIG. _8

METHOD AND APPARATUS FOR PROVIDING QUALITY OF SERVICE (QOS) IN A WIRELESS LOCAL AREA NETWORK

BACKGROUND

This disclosure relates to network devices and network communication.

Wireless local area networks (WLANs) are increasingly being used in many different applications, e.g., in home entertainment and business applications.

In one application of a conventional WLAN, one or more wireless clients (e.g., phone, speaker, television, projector, and so on) can be configured to be in communication with a single access point to receive and transmit information.

WLANs generally specify the technologies for wireless communication. Example WLANs can be implemented according to one or more of the following standards: IEEE standards 802.11, 802.11a, 802.11b, 802.11g, 802.11n, 802.16 and 802.20. WLANs typically implement one or more communication protocols in which information is transmitted in packets. Such communication protocols can specify features such as packet size, packet content information, data rates, roaming, and so on. WLANs generally include a communication medium (or transmission channel) that is shared by transmitters (e.g., an access point and one or more wireless clients). To avoid a collision between two transmitted packets on the shared communication medium, a WLAN can implement a CSMA/CA (carrier sense multiple access with collision avoidance) protocol.

FIG. 1 illustrates a timing sequence 100 for transmission of a packet according to a CSMA/CA protocol. When a wireless client wants to transmit a packet (e.g., to an access point), the wireless client first senses (or listens to) the shared communication medium to determine whether the shared communication medium is free (or idle). If the shared communication medium is sensed by the wireless client as being free, the wireless client waits for a DCF (Distributed Coordination Function) interframe space (DIFS), and then transmits a first packet. Otherwise, the wireless client defers access to the shared communication medium until the shared communication medium is free, and the wireless client commences a backoff procedure. The backoff procedure reflects a delay of a number of random timing slots. The random delay occurs during a contention window so that the likelihood of collision between transmitted packets on the shared communication medium is reduced. Thereafter, the wireless client again senses the shared communication medium. If the shared communication medium is free, the wireless client transmits a next packet on the shared communication medium.

Within the CSMA/CA protocol, each wireless client is also operable to send an acknowledgement (ACK) packet each time the wireless client correctly receives a packet. ACK packets are typically sent after a short interframe space (SIFS) as shown in FIG. 1.

In a given WLAN, packet sizes may vary. Therefore, a wireless client that has a large packet to transmit (or receive) may need to occupy the shared communication medium for a longer period of time than another wireless client that has a relatively shorter packet to transmit (or receive).

Unpredictable access to the shared communication medium and delays in transmission of packets may cause problems for a wireless client. For example, information required for providing seamless real time traffic (e.g., audio or video data) is generally much more time sensitive to delays than other non-real time traffic—e.g., if a delay exists in the capture or playback of audio or video data, a user may hear clicks and pops from audio data output or see modulating or jerky video output.

SUMMARY

In general, in one aspect, this specification describes a wireless client including a signaling engine, a negotiation engine, and a control engine. The signaling engine is operable to receive a discovery data packet. The negotiation engine is operable to generate and send a discovery response data packet to a querying system, in which the discovery response data packet includes capability information associated with the wireless client. The negotiation engine is further operable to receive a configuration packet containing configuration data related to one or more transmission parameters of the wireless client. The control engine is operable to configure one or more of the transmission parameters of the wireless client using the configuration packet.

Particular implementations can include one or more of the following features. The wireless client can include a congestion quality meter engine operable to generate and send a congestion quality metric to the querying system. The congestion quality metric represents packet traffic congestion as measured at the wireless client. The congestion quality meter engine can generate the congestion quality metric based on a number of packet transmission retries or a received signal strength. The congestion quality metric can be sent to the querying system within the discovery response data packet. The discovery data packet can contain a discovery protocol header having one or more fields for identification information or capability information associated with the wireless client.

The identification information can identify a type of the wireless client. The type of the wireless client can include one of a server, network, desktop workstation, laptop computer, hand-held personal computer, PDA, phone, data collector, speaker, television, or projector. The capability information can include one or more of decode requirements, bandwidth requirements, latency requirements, or rates at which the wireless client transmits or receives data. The transmission parameters can include one or more of a contention window size, interframe space size, retry count threshold, backoff count, audio rate, or video rate. The audio rate can correspond to a codec of FM quality or a codec of CD quality. The video rate can correspond to MP3 (MPEG-1 Layer 3 Digital Audio) or MP4 (MPEG-1 Layer 4 Digital Audio). The wireless client can provide audio or visual playback of real time traffic according to the configured transmission parameters.

In general, in another aspect, this specification describes a content server including a negotiation engine, a data generator and a configuration engine. The negotiation engine is operable to receive capability information from (N) wireless clients, in which (N) is an integer greater than or equal to (1). The data generator is operable to generate a configuration table including at least one selectable configuration option corresponding to the capability information of at least one of the (N) wireless clients. The data generator is further operable to receive user input selecting a configuration option within the configuration table. The configuration engine is operable to generate and send (S) configuration packets to at least one of the (N) wireless clients, in which (S) is an integer greater than or equal to (1). Each of the configuration packets contains configuration data for configuring one or more transmission parameters of a given wireless client based on the selected configuration option.

Particular implementations can include one or more of the following features. The content server can include a discovery engine operable to generate and send a discovery data packet to the (N) wireless clients. The discovery data packet can contain one or more fields for identification information or capability information associated with a given wireless client. The transmission parameters can include one or more of a contention window size, interframe space size, retry count threshold, backoff count, audio rate, or video rate. The capability information can include net usage capabilities of a given wireless client, in which the net usage capabilities define data rates at which the given wireless client can transmit or receive data.

The configuration table can include a presentation of one or more current performances of one or more computer data services. The one or more computer data services can include one or more of processor usage, memory usage, or Internet download rate. The negotiation engine can receive a congestion quality metric representing packet traffic congestion as measured at a given wireless client. The configuration table can include a presentation of the congestion quality metric. The negotiation engine can receive a congestion quality metric from a given wireless client at an interval that is dependent upon the selected configuration option for the given wireless client. The configuration engine can generate a configuration packet having configuration data for decreasing a contention window parameter, increasing a retry count threshold parameter, or decreasing an interframe space parameter of a given wireless client if the congestion quality metric represents a high level of packet congestion.

In general, in another aspect, this specification describes a computer program including instructions to cause a programmable processor to receive a discovery data packet; generate and send a discovery response data packet to a querying system, the discovery response data packet including capability information associated with a wireless client; receive a configuration packet containing configuration data related to one or more transmission parameters of the wireless client; and configure the one or more transmission parameters of the wireless client using the configuration packet.

In general, in another aspect, this specification describes a computer program including instructions to cause a programmable processor to receive capability information from (N) wireless clients. (N) is an integer greater than or equal to (1). The computer program further includes instructions to cause a programmable processor to generate a configuration table including at least one selectable configuration option corresponding to the capability information of at least one of the (N) wireless clients; receive user input selecting a configuration option within the configuration table; and generate and send (S) configuration packets to at least one of the (N) wireless clients, each configuration packet containing configuration data for configuring one or more transmission parameters of a given wireless client based on the selected configuration option. (S) is an integer greater than or equal to (1).

In general, in another aspect, this specification describes a discovery data packet. The discovery data packet includes a destination address field indicating a destination address for the discovery data packet, a source address field indicating a source address associated with the discovery data packet, a transmitting station address field indicating an address of a transmitting station, a receiving station address field indicating an address of a receiving station, and a discovery protocol header field containing one or more fields for identification information or capability information associated with a station.

Particular implementations can include one or more of the following features. The discovery protocol header field can include a latency field for containing data representing an amount of time for a given packet to travel from a source to a destination, a bandwidth field for containing data representing an amount of data that can be transmitted by a given station within a fixed amount of time, a type field for containing data representing whether a given client is to transmit real time or non-real time data, a security field for containing data representing security information associated with a given station, and an energy field for containing data representing an amount of energy consumed by a given station.

The discovery data packet can further include a frame control field indicating a protocol version associated with the discovery data packet, a duration ID field indicating a duration of the discovery data packet or indicating an address of the transmitting station, a sequence control field indicating an order of fields within the discovery data packet, and a frame check sequence field indicating a frame check sequence associated with the discovery data packet. Each of the destination address field, source address field, transmitting station address field, and receiving station address field can be 6 bytes in size. The discovery protocol header field can be 7 bytes in size. Each of the frame control field, duration ID field, and sequence control field can be 2 bytes in size. The frame check sequence field can be 4 bytes in size.

In general, in another aspect, this specification describes a configuration packet. The configuration packet includes a destination address field indicating a destination address for the configuration packet, a source address field indicating a source address associated with the configuration packet, a transmitting station address field indicating an address of a transmitting station, a receiving station address field indicating an address of a receiving station, and a configuration data field including configuration data for configuring transmission parameters associated with a given station.

Particular implementations can include one or more of the following features. The configuration data field can include a contention window field indicating a size for a contention window setting for a given station, a retry count field indicating a retry count threshold setting for a given station, a backoff field indicating a backoff count setting for a given station, and an interframe space field indicating an interframe space setting for a given station.

The configuration packet can further include a frame control field indicating a protocol version associated with the configuration packet, a duration ID field indicating a duration of the configuration packet or indicating an address of the transmitting station, a sequence control field indicating an order of fields within the configuration packet, and a frame check sequence field indicating a frame check sequence associated with the configuration packet.

Implementations can include one or more of the following advantages. A user can implement real time media within a congested network. In one implementation, no intelligence is required within an access point to configure wireless clients. The user can use current performance information to implement a desired tradeoff between one or more computer data services and usage capabilities of one or more wireless clients.

A congestion quality metric representing an amount of current packet traffic congestion as measured at a given wireless client can be used to automatically reconfigure one or more transmission parameters of the given wireless client to maintain a pre-determined level of playback (e.g., audio or visual playback) quality through the wireless client.

Other features and advantages are apparent from the following description, and from the claims.

DESCRIPTION OF DRAWINGS

FIG. 1 illustrates a timing sequence for transmission of a packet according to the CSMA/CA (carrier sense multiple access with collision avoidance) protocol.

FIG. 2 is a block diagram of a WLAN.

FIGS. 3A and 4A are block diagrams of a content server.

FIGS. 3B and 4B are block diagrams of a wireless client.

FIG. 5 is a block diagram of a discovery data packet.

FIG. 6 illustrates a configuration table.

FIG. 7 is a block diagram of a configuration packet.

FIG. 8 is a method for configuring a wireless client.

Like reference symbols in the various drawings indicate like elements.

DETAILED DESCRIPTION

FIG. 2 is a block diagram of a wireless local, area network (WLAN) 200. WLAN 200 includes a content server 202, a wireless access point 204, and wireless clients 206-210. Though three wireless clients 206-210 are illustrated in FIG. 2 by way of example, WLAN 200 can contain a different number of wireless clients. In WLAN 200, wireless access point 204 permits one or more wireless clients (e.g., wireless clients 206-210) to wirelessly communicate with content server 202. In one implementation, one or more of IEEE standards 802.11a, 802.11b and 802.11g specify the technologies for wireless communications in WLAN 200. IEEE standards 802.11, 802.11n, 802.16 and 802.20 can also specify the technologies for wireless communications in WLAN 200. Although WLAN 200 shown in FIG. 2 operates according to an infrastructure mode, other configurations are possible. For example, WLAN 200 can operate according to an ad-hoc mode in which content server 202 communicates directly with each of wireless clients 206-210 without an access point.

Content server 202 can be any type of system operable to store (or provide) digital data. For example, content server 202 can be a server, a network, a desktop workstation, laptop computer, hand-held personal computer, personal digital assistant (PDA), cellular phone, data collector, and so on. In one implementation, content server 202 is distributed among multiple systems in a WLAN. Content server 202 can also be integrated within wireless access point 204. Content server 202 can communicate with wireless access point 204 through a wireline or wirelessly.

Wireless access point 204 is an interface for communication between content server 202 and each of wireless clients 206-210. Wireless access point 204 can also be an interface between WLAN 200 and a wireline network (not shown)—e.g., an Ethernet network. Wireless access point 204 can be, e.g., an access point, a personal computer, a server, a workstation, and so on. At least one of wireless clients 206-210 can include any device operable to provide audio or video playback, e.g., a phone, speaker, television, projector, and so on. Each wireless client 206-210 can have different communication capabilities and requirements.

Content server 202 includes a QoS (Quality of Service) server engine (discussed below) and one or more of wireless clients 206-210 includes a QoS client engine (discussed below). The QoS server engine and the QoS client engine are operable to manage communication traffic in WLAN 200. More specifically, the QoS server engine and the QoS client engine manage communications, e.g., by controlling when and how packets are transmitted to (and from) each wireless client 206-210. The packets can include data packets (e.g., packets that carry data communications), voice packets (e.g., packets that carry voice communication), real-time packets (e.g., packets that carry real-time communications such as streaming video or audio), management packets (e.g., packets that carry network management communications), and so on. In one implementation, the QoS server engine and the QoS client engine manage communications based on user-selected options within a configuration table (described in greater detail below). The QoS server engine and the QoS client engine are also operable to manage communications in WLAN 200 based on packet traffic congestion as measured at one or more wireless clients 206-210.

The QoS server engine and the QoS client engine generally provides a pre-determined level of QoS for supporting communication (including real-time traffic) in WLAN 200. QoS is a term for characterizing a performance of packet flow and can be measured by, inter alia, packet transfer delay, jitter, probability of packet loss and throughput.

Referring to FIG. 3A, content server 202 includes a radio frequency (RF) transceiver 300, a baseband processor 302, a media access controller (MAC) 304, and a host device 305. RF transceiver 300 transmits and receives packets to/from each of wireless clients 206-210 (FIG. 2) through wireless access point 204 (FIG. 2). Baseband processor 302 processes the RF signals from/to baseband in conformance with a radio frequency transmission protocol. MAC 304 includes one or more processing engines for processing received/and to be transmitted signals and interfacing with network components. MAC 304 includes QoS server engine 306 for generating configuration packets for configuring transmission parameters of one or more of wireless clients 206-210 (FIG. 2). The transmission parameters control when and how packets are transmitted to (and from) each wireless client 206-210. In one implementation, the transmission parameters include media access parameters—e.g., contention window size, interframe space size, retry count threshold, backoff count and so on. The transmission parameters can also include net usage parameters—e.g., audio rate, video rate, and other data transmission rates. QoS server engine 306 can be in the form of hardware (circuits), software, firmware or combinations thereof. MAC 304 also provides a network interface to host device 305.

FIG. 4A shows QoS server engine 306 in greater detail. QoS server engine 306 includes a discovery engine 400, a negotiation engine 402, a data generator 404 and a configuration engine 406.

Discovery engine 400 generates a discovery data packet 500 (shown in FIG. 5). In one implementation, discovery data packet 500 includes a MAC header portion that allocates 2 bytes for frame control 502, 2 bytes for duration/ID 504, 6 bytes for a destination address 506, 6 bytes for a source address 508, 6 bytes for an address of a receiving station (e.g., a wireless client) 510, 2 bytes for sequence control 512, and 6 bytes for an address of a transmitting station (e.g., a wireless client) 514. Discovery data packet 500 also includes 7 bytes for a discovery protocol header 516 (which is explained in greater detail below). A 4-byte frame check sequence (FCS) 518 follows discovery protocol header 516.

Discovery protocol header 516 is recognizable by QoS client engines (e.g., QoS client engine 314) in WLAN 200. Discovery protocol header 516 contains one or more fields for identification information and/or capability information associated with a wireless client. Identification information can include, e.g., information that identifies a type of the wireless client (e.g., server, network, desktop workstation, laptop computer, hand-held personal computer, PDA, cellular phone, data collector, and so on) and a vendor name (or manufacturer name) of the wireless client. Capability information includes, for example, decode requirements, bandwidth requirements and latency requirements. Capability information can also include net usage capabilities of a given wireless client including rates at which the wireless client can transmit/receive data. In one implementation, the one or more fields are sent to a wireless client having default values which may be updated or revised by the wireless client. Optionally, discovery protocol header 516 can be sent to one or more wireless clients within unused fields of a beacon. A beacon is a packet sent by a device (e.g., a wireless client) to inform other devices of the device's presence and readiness.

In one implementation, discovery protocol header 516 includes a 1-byte latency field 520, a 2-byte bandwidth field 522, a 2-byte packet loss field 524, a 1-byte type field 526, a 1-byte security field 528 and a 1-byte energy field 530. Latency field 520 can contain data representing an amount of time (e.g., in milliseconds) for a given packet to travel from a source to a destination. Bandwidth field 522 can contain data representing an amount of data that can be transmitted (by a wireless client) within a fixed amount of time. The bandwidth can be expressed in megabits per second (Mbps). Packet loss field 524 can contain data representing a packet loss percentage associated with a given wireless client. Type field 526 can contain data representing whether a given wireless client is to transmit real time data or non-real time data. Security field 528 can contain data representing Wi-Fi Protected Access security information associated with a given wireless client. Energy field 530 can contain data representing an amount of energy (e.g., in mA-Hrs) consumed by a wireless client.

Negotiation engine 402 is operable to receive and process messages received from each wireless client responding to a discovery data packet (e.g., discovery data packet 500). Negotiation engine 402 is also operable to receive and process a local congestion quality metric received from each wireless client (having a QoS client engine). The local congestion quality metric represents local packet traffic congestion as measured at a given wireless client.

Data generator 404 is operable to generate and present a configuration table to a user. The configuration table can include identification information and capability information (as received by a wireless client) in any convenient form to the user. In one implementation, the configuration table also includes a local congestion quality metric as measured at each respective wireless client. The configuration table can also present recommended configuration options to the user.

The configuration table permits the user to select a net usage capability for one or more wireless clients to achieve a desired effect (e.g., a desired audio or visual playback). For example, a speaker may be able to process and output audio signals at a codec corresponding to FM quality (800 Kbps) or a codec corresponding to CD quality (1.5 Mbps). In this example, the configuration table can present the two codecs—i.e., FM quality and CD quality—as options that the user can select for a desired level of quality at which audio signals will be projected from the speaker.

FIG. 6 shows one example of a configuration table 600. Configuration table 600 includes a device type field 602, a capability field 604, a congestion quality field 606 and a recommendation field 608. Configuration table 600 can also include other fields (not shown) such as power of a wireless client, security information, peak bandwidth of a wireless client, device manufacturer information and so on.

Device type field 602 presents a device type of a given wireless client (e.g., phone, speaker, television, projector, and so on). For example, as shown in FIG. 6, configuration table 600 displays (2) device types—a speaker and a video TV1.

Capability field 604 presents capabilities corresponding to each wireless client. In one implementation, capability field 604 includes radio buttons 608 that permit a user to select a desired usage capability for a given wireless client. In the example shown in FIG. 6, a user has selected a particular coding, i.e., PCM (pulse code modulation), for the speaker and MP3 (MPEG-1 Layer 3 Digital Audio) for the video TV1.

Congestion quality field 606 presents packet traffic congestion as measured at one or more wireless clients (e.g., wireless clients 206-210). In one implementation, the packet traffic congestion is presented to a user in the form of a slider graphic 610. Measurement of packet traffic congestion is described in greater detail below.

Recommendation field 608 presents recommended configuration options for each wireless client to the user. The recommended configuration options can be determined based on application requirements, user-preferences, or other considerations.

Configuration table 600 can also include a presentation of current performances of one or more computer data services 612. Computer data services can include, e.g., processor usage, memory usage, Internet download rate, and other computer data services that can be monitored. In the example shown in FIG. 6, a system (e.g., system 202) is shown having a current download rate of 5.2 Mbps, as indicated by a sliding graphic 614. The download rate can change dependent upon user-selected usage capabilities for each respective wireless client. A user can use the performance information to implement a desired tradeoff between computer data services and usage capabilities of one or more wireless clients.

Referring back to FIG. 4A, QoS server engine 306 further includes a configuration engine 406. Configuration engine 406 generates a configuration packet 700 (shown in FIG. 7). In one implementation, configuration packet 700 includes a MAC header portion that allocates 2 bytes for frame control 702, 2 bytes for duration/ID 704, 6 bytes for a destination address 706, 6 bytes for a source address 708, 6 bytes for an address of a receiving station (e.g., a wireless client) 710, 2 bytes for sequence control 712, and 6 bytes for an address of a transmitting station (e.g., a wireless client) 714. Discovery data packet 500 also includes 4 bytes for a configuration data field 716 (which is explained in greater detail below). A 4-byte frame check sequence (FCS) 718 follows control data field 716.

Configuration data field 716 includes configuration data for configuring transmission parameters of a given wireless client. In one implementation, the transmission parameters are configured according to desired usage capabilities for each wireless client selected by the user in a configuration table (e.g., configuration table 600 (FIG. 6)).

In one implementation, configuration data field 716 includes a 1-byte contention window (CW) field 720, a 1-byte retry count field 722, a 1-byte backoff field 724 and a 1-byte interframe space (IFS) field 726. CW field 720 can contain data representing a size for a contention window setting for a wireless client. Retry count field 722 can contain data representing a retry count threshold setting for a wireless client. Backoff field 724 can contain data representing a backoff count setting for a wireless client. IFS field 726 can contain data representing an interframe space setting for a wireless client.

Referring to FIG. 3B, wireless client 206 includes an RF transceiver 308, a baseband processor 310, a MAC 312 and a client 313. In one implementation, RF transceiver 308 transmits and receives packets to/from wireless access point 204

(FIG. 2) through wireless access point 204 (FIG. 2). Baseband processor 310 processes the RF signals from/to baseband in conformance with a radio frequency transmission protocol. MAC 312 includes one or more processing engines for processing received/and to be transmitted signals and interfacing with network components. MAC 312 also provides a network interface to client device 313.

MAC 312 includes QoS client engine 314 for generating a local congestion quality metric that represents packet traffic congestion as measured at a given wireless client. QoS client engine 314 is also operable to configure a given wireless client based on control data within a configuration packet (e.g., configuration packet 700). QoS client engine 314 can be in the form of hardware (circuits), software, firmware or combinations thereof. MAC 312 also provides a network interface to client device 313.

Referring to FIG. 4B, QoS client engine 314 is shown in greater detail. QoS client engine 314 includes a signaling engine 408, a negotiation engine 410, a congestion quality meter engine 412 and a control engine 414. Signaling engine 408 is operable to detect discovery data packets 500 having a discovery protocol header 516 (FIG. 5). In one implementation, signaling engine 408 detects discovery data packets broadcast from a wireless access point (e.g., wireless access point 204 of FIG. 2).

Negotiation engine 410 includes one or more routines for sending identification information and capability information to negotiation engine 402 of QoS server engine 306. As discussed above, identification information can include, e.g., information that identifies a type of the wireless client and a vendor name of the wireless client. Capability information can include, for example, decode requirements, bandwidth requirements, latency requirements and net usage capabilities of a given wireless client.

In one implementation, negotiation engine 410 is operable to insert, update, or revise data within one or more fields of a discovery data packet, and send the revised discovery data packet as a discovery response data packet to a querying system (e.g., content server 202 of FIG. 2). For example, negotiation engine 410 can update default values within one or more fields in discovery protocol header 516 (FIG. 5), and send the revised values in a discovery response data packet.

Congestion quality meter engine 412 is operable to generate a local congestion quality metric for a corresponding wireless client that represents local packet traffic congestion as measured at the wireless client. The local congestion quality metric can be generated to have a value based on a number of packet transmission retries (or retry counts) and/or a received signal strength. In one implementation, the local congestion quality metric can be calculated as follows:

$$CQ(t) = a1 * \frac{d}{dt}(RC(t)) + \qquad (eq.\ 1)$$
$$a2 \frac{d2}{dt2}\bigl((RC(t)) + b1 * \frac{d}{dt}(RSSI(t)) + b2 * \frac{d2}{dt2}(RSSI(t))\bigr)$$

where CQ(t) represents the local congestion quality metric, RC(t) represents a number of retry counts, RSSI(t) represents a received signal strength, and coefficients a1, a2, b1, b2 are used to scale each corresponding factor.

The first derivative of RC(t) represents a current number of retry counts for packet transmission. The second derivative of RC(t) represents a rate at which the number of retry counts is increasing or decreasing. The first derivative of RSSI(t) represents a current received signal strength. The second derivative of RSSI(t) represents a rate at which the signal strength is increasing or decreasing. Thus, for example, if a received signal strength is strong, and a number of retry counts is high, then congestion quality meter engine will indicate a higher degree of packet traffic congestion relative to a time when a number of retry counts is high and a received signal strength is low.

Control engine 414 is operable to configure transmission parameters of a corresponding wireless client based on configuration data within a configuration packet (e.g., configuration packet 700 of FIG. 7). In one implementation, control engine 414 is operable to configure transmission parameters including media access parameters—e.g., contention window size, interframe space size, retry count threshold, backoff count and so on. Control engine 414 is also operable to configure net usage parameters—e.g., audio rate, video rate, and other data transmission rates—of a corresponding wireless client.

FIG. 8 shows a method 800 for configuring one or more wireless clients (e.g., wireless clients 206-210) in a WLAN. Referring to FIGS. 2, 3A, 3B, 4A, 4B, 5, 7 and 8, a discovery data packet is sent to one or more wireless clients (e.g., wireless client 206) having a QoS client engine (e.g., QoS client engine 314) (step AP802). In one implementation, a discovery data packet (e.g., discovery data packet 500) is transmitted from an access point (e.g., access point 204) as a broadcast data packet that is received by all wireless clients in a WLAN. The discovery data packet includes a discovery protocol header (e.g., discovery protocol header 516) that is recognizable by QoS client engines in the WLAN. As discussed above, the discovery protocol header contains one or more fields for identification information and capability information associated with a given wireless client.

Each wireless client having a QoS client engine receives and responds to the discovery data packet (step CL804). A signaling engine (e.g., signaling engine 408) associated with a corresponding QoS client engine can detect discovery data packets having a discovery protocol header. In one implementation, a negotiation engine (e.g., negotiation engine 410) associated with the QoS client engine responds to the discovery protocol header and generates a discovery response data packet (step CL806). In one implementation, the negotiation engine generates a discovery response data packet by inserting, revising or updating data within one or more fields of the discovery protocol header to contain identification information and/or capability information of a corresponding wireless client. The identification information can include information that identifies a type of the wireless client and a vendor name of the wireless client. Capability information can include, for example, decode requirements, bandwidth requirements, latency requirements and net usage capabilities of a given wireless client. The discovery response data packet of a negotiation engine can also include a local congestion quality metric that represents local packet traffic congestion as measured at a corresponding wireless client. In one implementation, the local congestion quality metric is generated by a congestion quality meter engine (e.g., congestion quality meter engine 412) to have a value based on a number of packet transmission retries (or retry counts) and/or a received signal strength.

A data generator (e.g., data generator 404) in the QoS server engine generates a configuration table (step AP808). The configuration table can include identification information and capability information (as received from a wireless client) in any convenient form to the user. In one implementation, the configuration table includes a local congestion quality metric as measured at each respective wireless client.

The configuration table can also present recommended configuration options (e.g., for one or more wireless clients) to the user, as discussed above.

User input selecting one or more configuration options is received (step AP810). In one implementation, a user selection is received through a graphical user interface. One example of a graphical user interface is shown in FIG. 6. A configuration engine (e.g., configuration engine 406) of the QoS server engine generates and sends one or more configuration packets to one or more wireless clients (step AP812). Each configuration packet (e.g., configuration packet 700) includes a configuration data field (e.g., configuration data field 716) having configuration data for configuring transmission parameters associated with a given wireless client. The transmission parameters can include media access parameters and net usage parameters as discussed above.

In one implementation, the configuration data within the configuration data field is set as follows.

If the congestion quality metric is high (representing high packet traffic congestion as measured at a given wireless client) and a user has prioritized real-time traffic (e.g., streaming video) over computer data services (e.g., data downloads), then a configuration engine (e.g., configuration engine 406) configures a CW field (e.g., CW field 720) to contain data representing a minimum size (e.g., CWmin) for a contention window of the given wireless client. A retry count field (e.g., retry count field 722) is configured to contain data representing a high retry count threshold (e.g., 4). A backoff field (e.g., backoff field 724) can be configured to contain data representing a nominal backoff count for optimized packet flow through the congested network. An IFS field (e.g., IFS field 726) is configured to contain data representing a minimal interframe space setting (e.g., (0) UI (Unit Interval)).

If the congestion quality metric is low (representing low packet traffic congestion as measured at a given wireless client) and a user has prioritized real-time traffic over computer data services, then the configuration engine configures the CW field to contain data representing a nominal size for a contention window. The retry count field is configured to contain data representing a minimum retry count threshold (e.g., 2). The backoff field can be configured to contain data representing a nominal backoff count. The IFS field is configured to contain data representing an interframe space size according to a DCF (Distributed Coordination Function) interframe space (DIFS).

If the congestion quality metric is high and a user has prioritized computer data services over real-time traffic, then the configuration engine configures the CW field to contain data representing a nominal size for a contention window. The retry count field is configured to contain data representing a minimum retry count threshold (e.g., 2). The backoff field can be configured to contain data representing a nominal backoff count. The IFS field is configured to contain data representing a minimum interframe space size.

If the congestion quality metric is low and a user has prioritized computer data services over real-time traffic, then configuration engine 406 configures CW field 720 to contain data representing a nominal size for a contention window. Retry count field 722 is configured to contain data representing a minimum retry count threshold (e.g., 2). Backoff field 724 can be configured to contain data representing a nominal backoff count. IFS field 726 is configured to contain data representing an interframe space size according to a DIFS.

One or more configuration packets are received at one or more wireless clients (step CL814). One or more transmission parameters associated with a wireless client is configured according to configuration data within a configuration data field (step CL816). In one implementation, a control engine (e.g., control engine 414) is operable to configure transmission parameters of a corresponding wireless client. The transmission parameters can include media access parameters and net usage parameters (as discussed above).

Each wireless client is further operable to send an updated (or current) calculation of the local congestion quality metric to the QoS server engine (step CL818). The local congestion quality metric is a metric that can vary in real time. For example, local packet traffic at a wireless client may change as other wireless clients are added to or dropped from a WLAN. In one implementation, updates of the congestion quality metric are sent by the congestion quality meter engine at an interval that is dependent upon a user-selected codec (or data transmission rate) for the corresponding wireless client. More generally, updates of the congestion quality metric can be sent at other discrete time intervals, e.g., whenever a new wireless client is added or dropped from the WLAN. Method 800, then returns to step AP812, in which new configuration packets are generated and sent to one or more wireless clients as necessary.

A number of implementations have been described. Nevertheless, it will be understood that various modifications may be made. Though the various engines and components have been described above as separate, plural components can be combined in singular circuitry, engines, programs or the like. The methods described may be implemented in embedded systems, hardware, firmware, software, or combinations thereof, or in a computer program product tangibly embodied in a computer readable storage device. Storage devices suitable for tangibly embodying the computer program include all forms of non-volatile memory including semiconductor memory devices. Accordingly, other implementations are within the scope of the following claims.

What is claimed is:

1. A wireless client comprising hardware effecting:

a signaling engine of the hardware operable to receive a discovery data packet configured to determine an identity of a wireless client;

a negotiation engine operable to:

a) generate and send a discovery response data packet to a querying system, the discovery response data packet including capability information associated with the wireless client; and b) receive a configuration packet containing configuration data related to one or more transmission parameters of the wireless client, the transmission parameters relating to a network quality of service (QoS), the configuration data being determined by the querying system;

a control engine operable to configure the one or more transmission parameters of the wireless client using the configuration packet; and a congestion quality meter engine operable to generate and send a congestion quality metric to the querying system, the congestion quality metric representing packet traffic congestion as measured at the wireless client, wherein the congestion quality meter engine is operable to generate the congestion quality metric based on a number of packet transmission retries or a received signal strength, and the congestion quality metric is generated based on the following equation:

$$CQ(t) = a1 * \frac{d}{dt}(RC(t)) + a2\frac{d2}{dt2}\left((RC(t)) + b1 * \frac{d}{dt}(RSSI(t)) + b2 * \frac{d2}{dt2}(RSSI(t))\right),$$

where CQ(t) represents the congestion quality metric, RC(t) represents the number of packet transmission retries, RSSI(t) represents the received signal strength, and coefficients a1, a2, b1, b2 are scalars.

2. The wireless client of claim 1, wherein the congestion quality metric is sent to the querying system within the discovery response data packet.

3. The wireless client of claim 1, wherein the discovery data packet contains a discovery protocol header having one or more fields for identification information or capability information associated with the wireless client.

4. The wireless client of claim 3, wherein the identification information identifies a type of the wireless client.

5. The wireless client of claim 3, wherein the capability information includes one or more of decode requirements, bandwidth requirements, latency requirements, or rates at which the wireless client transmits or receives data.

6. The wireless client of claim 1, wherein the transmission parameters include one or more of a contention window size, interframe space size, retry count threshold, backoff count, audio rate, or video rate.

7. The wireless client of claim 6, wherein the audio rate corresponds to a codec of FM quality or a codec of CD quality.

8. The wireless client of claim 6, wherein the video rate corresponds to MP3 (MPEG-1 Layer 3 Digital Audio) or MP4 (MPEG-1 Layer 4 Digital Audio).

9. The wireless client of claim 1, wherein the wireless client is operable to provide audio or visual playback of real time traffic according to the one or more transmission parameters.

10. The wireless client of claim 1, further comprising a transceiver operable to receive the discovery data packet, receive the configuration packet, or transmit the discovery response data packet in accordance with one or more of the following IEEE wireless communication protocols: 802.11, 802.11a, 802.11b, 802.11g, 802.11n, 802.16 and 802.20.

11. The wireless client of claim 1, wherein the negotiation engine modifies one or more data fields of the discovery data packet to generate the discovery response data packet.

12. The wireless client of claim 1, wherein the discovery data packet is operable to discover an identity of the wireless client unknown to the query system.

13. The wireless client of claim 1, wherein the one or more transmission parameters are determined based on the network QoS.

14. The wireless client of claim 1, wherein the network QoS is determined based on the congestion quality metric that represents packet traffic congestion as measured at the wireless client.

15. The wireless client of claim 1, wherein the network QoS is determined based on one or more of packet transfer delay, jitter, probability of packet loss, or throughput.

16. A wireless client comprising:
a signaling means for receiving a discovery data packet configured to determine an identity of a wireless client;
a negotiation means for:
  a) generating and sending a discovery response data packet to a querying system, the discovery response data packet including capability information associated with the wireless client; and
  b) receiving a configuration packet containing configuration data related to one or more transmission parameters of the wireless client, the transmission parameters relating to a network quality of service (QoS), the configuration data being determined by the querying system;
a control means for configuring the one or more transmission parameters of the wireless client using the configuration packet; and
a congestion quality means for generating and sending a congestion quality metric to the querying system, the congestion quality metric representing packet traffic congestion as measured at the wireless client, wherein the congestion quality means is operable to generate the congestion quality metric based on a number of packet transmission retries or a received signal strength, and the congestion quality metric is generated based on the following equation:

$$CQ(t) = a1 * \frac{d}{dt}(RC(t)) + a2\frac{d2}{dt2}\left((RC(t)) + b1 * \frac{d}{dt}(RSSI(t)) + b2 * \frac{d2}{dt2}(RSSI(t))\right),$$

where CQ(t) represents the congestion quality metric, RC(t) represents the number of packet transmission retries, RSSI(t) represents the received signal strength, and coefficients a1, a2, b1, b2 are scalars.

17. The wireless client of claim 16, wherein the congestion quality metric is sent to the querying system within the discovery response data packet.

18. The wireless client of claim 16, wherein the discovery data packet contains a discovery protocol header having one or more fields for identification information or capability information associated with the wireless client.

19. The wireless client of claim 18, wherein the identification information identifies a type of the wireless client.

20. The wireless client of claim 18, wherein the capability information includes one or more of decode requirements, bandwidth requirements, latency requirements, or rates at which the wireless client transmits or receives data.

21. The wireless client of claim 16, wherein the transmission parameters include one or more of a contention window size, interframe space size, retry count threshold, backoff count, audio rate, or video rate.

22. The wireless client of claim 21, wherein the audio rate corresponds to a codec of FM quality or a codec of CD quality.

23. The wireless client of claim 21, wherein the video rate corresponds to MP3 (MPEG-1 Layer 3 Digital Audio) or MP4 (MPEG-1 Layer 4 Digital Audio).

24. The wireless client of claim 16, wherein the wireless client is operable to provide audio or visual playback of real time traffic according to the one or more transmission parameters.

25. The wireless client of claim 16, further comprising transceiver means for receiving the discovery data packet, receiving the configuration packet, or transmitting the discovery response data packet in accordance with one or more of the following IEEE wireless communication protocols: 802.11, 802.11a, 802.11b, 802.11g, 802.11n, 802.16 and 802.20.

26. The wireless client of claim 16, wherein the negotiation engine modifies one or more data fields of the discovery data packet to generate the discovery response data packet.

27. A method comprising:
receiving a discovery data packet configured to determine an identity of a wireless client;
generating and sending a discovery response data packet to a querying system, the discovery response data packet including capability information associated with the wireless client;
receiving a configuration packet containing configuration data related to one or more transmission parameters of the wireless client, the transmission parameters relating to a network quality of service (QoS), the configuration data being determined by the querying system;
configuring the one or more transmission parameters of the wireless client using the configuration packet; and
generating and sending a congestion quality metric to the querying system, the congestion quality metric representing packet traffic congestion as measured at the wireless client, wherein the congestion quality metric is generated based on a number of packet transmission retries or a received signal strength, and the congestion quality metric is generated based on the following equation:

$$CQ(t) = a1 * \frac{d}{dt}(RC(t)) + a2\frac{d2}{dt2}\bigl((RC(t)) + b1 * \frac{d}{dt}(RSSI(t)) + b2 * \frac{d2}{dt2}(RSSI(t)),$$

where CQ(t) represents the congestion quality metric, RC(t) represents the number of packet transmission retries, RSSI(t) represents the received signal strength, and coefficients a1, a2, b1, b2 are scalars.

28. The method of claim 27, wherein sending the congestion quality metric includes sending the congestion quality metric to the querying system within the discovery response data packet.

29. The method of claim 27, wherein configuring the one or more transmission parameters includes configuring one or more of a contention window size, interframe space size, retry count threshold, backoff count, audio rate, or video rate.

30. The method of claim 27, further comprising providing audio or visual playback of real time traffic through the wireless client according to the one or more transmission parameters.

31. The method of claim 27, where generating the discovery response data packet includes modifying one or more data fields of the discovery data packet.

32. A content server comprising hardware effecting:
a negotiation engine of the hardware operable to receive capability information from (N) wireless clients, (N) being an integer greater than or equal to (1);
a data generator operable to generate a configuration table including at least one selectable configuration option corresponding to the capability information of at least one of the (N) wireless clients, the data generator further operable to receive user input selecting a configuration option within the configuration table, wherein the configuration table further includes a presentation of one or more current performances of one or more computer data services, and the one or more computer data services include one or more of processor usage, memory usage, or Internet download rate; and
a configuration engine operable to generate and send (S) configuration packets to at least one of the (N) wireless clients, each configuration packet containing configuration data for configuring one or more transmission parameters of a given wireless client based on the selected configuration option, (S) being an integer greater than or equal to (1), the transmission parameters relating to a network quality of service (QoS).

33. The content server of claim 32, further comprising a discovery engine, the discovery engine operable to generate and send a discovery data packet to the (N) wireless clients, the discovery data packet having one or more fields for identification information or capability information associated with a given wireless client.

34. The content server of claim 32, wherein the transmission parameters include one or more of a contention window size, interframe space size, retry count threshold, backoff count, audio rate, or video rate.

35. The content server of claim 32, wherein the capability information includes net usage capabilities of a given wireless client, the net usage capabilities defining data rates at which the given wireless client can transmit or receive data.

36. The content server of claim 32, wherein:
the negotiation engine is further operable to receive a congestion quality metric representing packet traffic congestion as measured at a given wireless client; and
the configuration table further includes a presentation of the congestion quality metric.

37. The content server of claim 36, wherein the negotiation engine receives a congestion quality metric from a given wireless client at an interval that is dependent upon the selected configuration option for the given wireless client.

38. The content server of claim 36, wherein the configuration engine is operable to generate a configuration packet having configuration data for decreasing a contention window parameter of a given wireless client if the congestion quality metric represents a high level of packet congestion.

39. The content server of claim 36, wherein the configuration engine is operable to generate a configuration packet having configuration data for increasing a retry count threshold parameter of a given wireless client if the congestion quality metric represents a high level of packet congestion.

40. The content server of claim 36, wherein the configuration engine is operable to generate a configuration packet having configuration data for decreasing an interframe space parameter of a given wireless client if the congestion quality metric represents a high level of packet congestion.

41. The content server of claim 32, further comprising a transceiver operable to transmit the (S) configuration packets in accordance with one or more of the following IEEE wireless communication protocols: 802.11, 802.11a, 802.11b, 802.11g, 802.11n, 802.16 and 802.20.

42. A wireless access point comprising the content server of claim 32.

43. A system comprising the content server of claim 32 and a wireless access point.

44. A content server comprising:
negotiation means for receiving capability information from (N) wireless clients, (N) being an integer greater than or equal to (1);
data generator means for generating a configuration table including at least one selectable configuration option corresponding to the capability information of at least one of the (N) wireless clients, the data generator means further operable to receive user input selecting a configuration option within the configuration table; and configuration means for generating and sending (S) configuration packets to at least one of the (N) wireless clients, each configuration packet containing configuration data for configuring one or more transmission parameters of a given wireless client based on the selected configuration option, (S) being an integer greater than or equal to (1), the transmission parameters relating to a network quality of service (QoS), wherein the negotiation means further comprises means for receiving a congestion quality metric representing packet traffic congestion as measured at a given wireless client, the configuration table further includes a presentation of the congestion quality metric, and the negotiation means receives the congestion quality metric from the given wireless client at an interval that is dependent upon the selected configuration option for the given wireless client.

45. The content server of claim 44, further comprising discovery means for generating and sending a discovery data packet to the (N) wireless clients, the discovery data packet having one or more fields for identification information or capability information associated with a given wireless client.

46. The content server of claim 44, wherein the transmission parameters include one or more of a contention window size, interframe space size, retry count threshold, backoff count, audio rate, or video rate.

47. The content server of claim 44, wherein the capability information includes net usage capabilities of a given wireless client, the net usage capabilities defining data rates at which the given wireless client can transmit or receive data.

48. The content server of claim 44, wherein the configuration table further includes a presentation of one or more current performances of one or more computer data services.

49. The content server of claim 48, wherein the one or more computer data services include one or more of processor usage, memory usage, or Internet download rate.

50. The content server of claim 44, wherein the configuration means comprises means for generating a configuration packet having configuration data for decreasing a contention window parameter of a given wireless client if the congestion quality metric represents a high level of packet congestion.

51. The content server of claim 44, wherein the configuration means comprises means for generating a configuration packet having configuration data for increasing a retry count threshold parameter of a given wireless client if the congestion quality metric represents a high level of packet congestion.

52. The content server of claim 44, wherein the configuration means comprises means for generating a configuration packet having configuration data for decreasing an interframe space parameter of a given wireless client if the congestion quality metric represents a high level of packet congestion.

53. The content server of claim 44, further comprising transceiver means for transmitting the (S) configuration packets in accordance with one or more of the following IEEE wireless communication protocols: 802.11, 802.11a, 802.11b, 802.11g, 802.11n, 802.16 and 802.20.

54. A wireless access point comprising the content server of claim 44.

55. A system comprising the content server of claim 44 and a wireless access point means.

56. A method comprising:
receiving capability information from (N) wireless clients, (N) being an integer greater than or equal to (1);
generating a configuration table including at least one selectable configuration option corresponding to the capability information of at least one of the (N) wireless clients, wherein the configuration table further includes a presentation of one or more current performances of one or more computer data services, and the one or more computer data services include one or more of processor usage, memory usage, or Internet download rate;
receiving user input selecting a configuration option within the configuration table; and
generating and sending (S) configuration packets to at least one of the (N) wireless clients, each configuration packet containing configuration data for configuring one or more transmission parameters of a given wireless client based on the selected configuration option, (S) being an integer greater than or equal to (1), the transmission parameters relating to a network quality of service (QoS).

57. The method of claim 56, further comprising generating and sending a discovery data packet to the (N) wireless clients, the discovery data packet having one or more fields for identification information or capability information associated with a given wireless client.

58. The method of claim 56, wherein generating (S) configuration packets includes generating (S) configuration packets containing configuration data for configuring one or more transmission parameters including one or more of a contention window size, interframe space size, retry count threshold, backoff count, audio rate, or video rate.

59. The method of claim 56, wherein receiving capability information includes receiving net usage capabilities associated with a given wireless client, the net usage capabilities defining data rates at which the given wireless client can transmit or receive data.

60. The method of claim 56, further comprising:
receiving a congestion quality metric representing packet traffic congestion as measured at a given wireless client; and
wherein generating a configuration table includes generating a configuration table having a presentation of the congestion quality metric.

61. The method of claim 60, wherein receiving a congestion quality metric includes receiving a congestion quality metric from a given wireless client at an interval that is dependent upon the selected configuration option for the given wireless client.

62. The method of claim 60, wherein generating a configuration packet includes generating a configuration packet having configuration data for decreasing a contention window parameter of a given wireless client if the congestion quality metric represents a high level of packet congestion.

63. The method of claim 60, wherein generating a configuration packet includes generating a configuration packet having configuration data for increasing a retry count threshold parameter of a given wireless client if the congestion quality metric represents a high level of packet congestion.

64. The method of claim 60, wherein generating a configuration packet includes generating a configuration packet having configuration data for decreasing an interframe space parameter of a given wireless client if the congestion quality metric represents a high level of packet congestion.

65. A non-transitory computer-readable medium having instructions stored thereon, which, when executed by a processor, causes the processor to:
receive a discovery data packet configured to determine an identity of a wireless client;
generate and send a discovery response data packet to a querying system, the discovery response data packet including capability information associated with the wireless client;

receive a configuration packet containing configuration data related to one or more transmission parameters of the wireless client, the transmission parameters relating to a network quality of service (QoS), the configuration data being determined by the querying system;

configure the one or more transmission parameters of the wireless client using the configuration packet; and generate and send a congestion quality metric to the querying system, the congestion quality metric representing packet traffic congestion as measured at the wireless client, wherein the congestion quality metric is generated based on a number of packet transmission retries or a received signal strength, and the congestion quality metric is generated based on the following equation:

$$CQ(t) = a1 * \frac{d}{dt}(RC(t)) + a2\frac{d2}{dt2}\big((RC(t)) + b1 * \frac{d}{dt}(RSSI(t)) + b2 * \frac{d2}{dt2}(RSSI(t)),$$

where CQ(t) represents the congestion quality metric, RC(t) represents the number of packet transmission retries, RSSI(t) represents the received signal strength, and coefficients a1, a2, b1, b2 are scalars.

66. The non-transitory computer-readable medium of claim 65, wherein the instructions to send the congestion quality metric include instructions to send the congestion quality metric to the querying system within the discovery response data packet.

67. The non-transitory computer-readable medium of claim 65, wherein the instructions to configure the one or more transmission parameters include instructions to configure one or more of a contention window size, interframe space size, retry count threshold, backoff count, audio rate, or video rate.

68. The non-transitory computer-readable medium of claim 65, further comprising instructions to cause a programmable processor to provide audio or visual playback of real time traffic through the wireless client according to the one or more transmission parameters.

69. A non-transitory computer-readable medium having instructions stored thereon, which, when executed by a processor, causes the processor to:

receive capability information from (N) wireless clients, (N) being an integer greater than or equal to (1);

generate a configuration table including at least one selectable configuration option corresponding to the capability information of at least one of the (N) wireless clients;

receive user input selecting a configuration option within the configuration table;

generate and send (S) configuration packets to at least one of the (N) wireless clients, each configuration packet containing configuration data for configuring one or more transmission parameters of a given wireless client based on the selected configuration option, (S) being an integer greater than or equal to (1), the transmission parameters relating to a network quality of service (QoS); and receive a congestion quality metric representing packet traffic congestion as measured at a given wireless client, wherein the configuration table includes a presentation of the congestion quality metric, and the congestion quality metric is received from the given wireless client at an interval that is dependent upon the selected configuration option for the given wireless client.

70. The non-transitory computer-readable medium of claim 69, further comprising instructions to cause a programmable processor to generate and send a discovery data packet to the (N) wireless clients, the discovery data packet having one or more fields for identification information or capability information associated with a given wireless client.

71. The non-transitory computer-readable medium of claim 69, wherein the instructions to generate (S) configuration packets include instructions to generate (S) configuration packets containing configuration data for configuring one or more transmission parameters including one or more of a contention window size, interframe space size, retry count threshold, backoff count, audio rate, or video rate.

72. The non-transitory computer-readable medium of claim 69, wherein the instructions to receive capability information include instructions to receive net usage capabilities associated with a given wireless client, the net usage capabilities defining data rates at which the given wireless client can transmit or receive data.

73. The non-transitory computer-readable medium of claim 69, wherein the instructions to generate a configuration table include instructions to generate a configuration table having a presentation of one or more current performances of one or more computer data services.

74. The non-transitory computer-readable medium of claim 73, wherein the instructions to generate a configuration table having a presentation of one or more current performances of one or more computer data services include instructions to generate a configuration table having a presentation of one or more of processor usage, memory usage, or Internet download rate.

75. The non-transitory computer-readable medium of claim 69, wherein the instructions to generate a configuration packet include instruction to generate a configuration packet having configuration data for decreasing a contention window parameter of a given wireless client if the congestion quality metric represents a high level of packet congestion.

76. The non-transitory computer-readable medium of claim 69, wherein the instructions to generate a configuration packet include instructions to generate a configuration packet having configuration data for increasing a retry count threshold parameter of a given wireless client if the congestion quality metric represents a high level of packet congestion.

77. The non-transitory computer-readable medium of claim 69, wherein the instructions to generate a configuration packet include instructions to generate a configuration packet having configuration data for decreasing an interframe space parameter of a given wireless client if the congestion quality metric represents a high level of packet congestion.

* * * * *